United States Patent
Shriraghav et al.

(10) Patent No.: US 7,406,479 B2
(45) Date of Patent: Jul. 29, 2008

(54) PRIMITIVE OPERATOR FOR SIMILARITY JOINS IN DATA CLEANING

(75) Inventors: Kaushik Shriraghav, Bellevue, WA (US); Surajit Chaudhuri, Redmond, WA (US); Venkatesh Ganti, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 288 days.

(21) Appl. No.: 11/352,141

(22) Filed: Feb. 10, 2006

(65) Prior Publication Data

US 2007/0192342 A1 Aug. 16, 2007

(51) Int. Cl.
G06F 17/00 (2006.01)

(52) U.S. Cl. .................. 707/102; 707/100; 707/101

(58) Field of Classification Search .............. None
See application file for complete search history.

(56) References Cited

U.S. PATENT DOCUMENTS

| 2004/0260694 | A1 | 12/2004 | Chaudhuri et al. |
| 2005/0055321 | A1* | 3/2005 | Fratkina et al. ............... 706/45 |
| 2005/0262044 | A1 | 11/2005 | Chaudhuri et al. |
| 2006/0179052 | A1* | 8/2006 | Pauws et al. .................. 707/6 |

OTHER PUBLICATIONS

Ananthakrishna, et al. "Eliminating Fuzzy Duplicates in Data Warehouses" Proceedings if the 28th VLDB Conference, Hong Kong, China (2002) 12 pages.

Chatziantoniou, et al. "Querying Multiple Features of Groups in Relational Databases" Proceedings of the 22nd VLDB Conference Mumbai(Bombay), India (1996) pp. 295-306.

Chatziantoniou, et al. "Groupwise Processing of Relational Queries" Proceedings of the 23rd VLDB Conference Athens, Greece (1997) pp. 476-485.

Chaudhuri, et al. "Robust and Efficient Fuzzy Match for Online Data Cleaning" SIGMOD San Diego, California (Jun. 9-12, 2003) 12 pages.

Cohen, William W. "Data Integration Using Similarity Joins and a Word-Based Information Representation Language" ACM Transactions of Information Systems, vol. 18 No. 3 (Jul. 2000) 34 pages.

(Continued)

*Primary Examiner*—Sana Al-Hashemi
(74) *Attorney, Agent, or Firm*—Amin, Turocy & Calvin, LLP

(57) ABSTRACT

A set similarity join system and method are provided. The system can be employed to facilitate data cleaning based on similarities through the identification of "close" tuples (e.g., records and/or rows). "Closeness" can be is evaluated using a similarity function(s) chosen to suit the domain and/or application. Thus, the system facilitates generic domain-independent data cleansing.

The system can be employed with a foundational primitive, the set similarity join (SSJoin) operator, which can be used as a building block to implement a broad variety of notions of similarity (e.g., edit similarity, Jaccard similarity, generalized edit similarity, hamming distance, soundex, etc.) as well as similarity based on co-occurrences. The SSJoin operator can exploit the observation that set overlap can be used effectively to support a variety of similarity functions. The SSJoin operator compares values based on "sets" associated with (or explicitly constructed for) each one of them.

19 Claims, 13 Drawing Sheets

OTHER PUBLICATIONS

Gravano, et al. "Text Joins in an RDBMS for Web Data Integration" WWW2003 Budapest, Hungary (May 20-24, 2003) 12 pages.

Gravano, et al. Approximate String Joins in a Database (Almost) for Free) Proceedings of the 27th VLDB Conference, Rome, Italy (2001) 10 pages.

Guha, et al. "Merging the Results of Approximate Match Operations" Proceedings of the 30th VLDB Conference, Toronto, Canada (2004)pp. 636-647.

Hernandez, et al. "The Merge/Purge Problem for Large Databases" SIGMOD San Jose, California (1995) pp. 127-138.

Ramasamy, et al. "Set Containment Joins: The Good, The Bad and The Ugly" Proceedings of the 26th VLDB Conference, Cario, Egypt (2000) pp. 351-362.

Sarawagi, et al. "Efficient Set of Joins on Similarity Predicates" SIGMOD Paris, France (Jun. 13-18, 2004) 12 pages.

Chaudhuri, et al. "Robust Identification of Fuzzy Duplicates" (2004) Proceedings of the 1st ACM Workshop on Hardcopy Document Proceedings 12 pages.

Felligi, et al. "A Theory for Record Linkage" (1969) American Statistical Association vol. 64, 29 pages.

* cited by examiner

200

| OrgName | 3-gram | Norm |
|---|---|---|
| Microsoft Corp | mic | 12 |
| Microsoft Corp | icr | 12 |
| Microsoft Corp | cro | 12 |
| ... | ... | ... |
| Microsoft Corp | cor | 12 |
| Microsoft Corp | orp | 12 |

R

210

| OrgName | 3-gram | Norm |
|---|---|---|
| Mcrosoft Corp | mcr | 11 |
| Mcrosoft Corp | cro | 11 |
| Mcrosoft Corp | ros | 11 |
| ... | ... | ... |
| Mcrosoft Corp | cor | 11 |
| Mcrosoft Corp | orp | 11 |

PRIMITIVE OPERATOR FOR SIMILARITY JOINS IN DATA CLEANING

BACKGROUND

Data warehouses, which are repositories of data collected from several data sources, form the backbone of most current CRM and decision support applications. Data entry mistakes at any of these sources can introduce errors. Since high quality data is important for gaining the confidence of users of CRM and decision support applications developed over data warehouses, ensuring data quality is important to the success of data warehouse implementations. Therefore, great amounts of time and money are spent on the process of detecting and correcting errors and inconsistencies. Significantly, the types of errors and inconsistencies can be domain-specific.

The process of cleaning dirty data is often referred to as "data cleaning". Data cleaning is an essential step in populating and maintaining data warehouses and centralized data repositories. A very important data cleaning operation is that of "joining" similar data. For example, consider a sales data warehouse. Owing to various errors in the data due to typing mistakes, differences in conventions, etc., product names and customer names in sales records may not match exactly with master product catalog and reference customer registration records respectively.

The problem of detecting and eliminating duplicated data is one of the major problems in the broad area of data cleaning and data quality. It is often the case that the same logical real world entity can have multiple representations in the data warehouse. For example, when a customer named Lisa buys purchases products from a retailer twice, her name might appear as two different records: [Lisa Doe, Seattle, Wash., USA, 98025] and [Lisa Do, Seattle, Wash., United States, 98025]. The discrepancy can be due, for example, to data entry errors and/or preferences of the salesperson who enters the data. Such duplicated information can significantly increase direct mailing costs because several customers like Lisa may receive multiple catalogs. In direct mailing campaigns with tight budget constraints such errors can be the difference between success and failure of the campaign. Moreover, such errors can cause incorrect results in analysis queries (e.g., How many customers of the retailer are there in Seattle?) as well as erroneous analysis models to be built.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A set similarity join system and method are provided. The system can be employed to facilitate data cleaning based on similarities through the identification of "close" tuples (e.g., records and/or rows). "Closeness" can be is evaluated using a similarity function(s) (e.g., chosen to suit the domain and/or application). Conventional approaches have been tightly tied to a particular similarity function—however, no single string similarity function is known to be the overall best similarity function. The system facilitates generic domain-independent data cleansing.

With respect to the claimed set similarity join system and method, the "similarity join" of two relations R and S both containing a column A is the join $R \bowtie_\theta S$ where the join predicate $\theta$ is $f(R.A; S.A) > \alpha$, for a given similarity function $f$ and a threshold $\alpha$. The system facilitates a general purpose data cleaning platform which can efficiently support similarity joins with respect to a variety of similarity functions. For example, the system can be employed with a foundational primitive, the set similarity join (SSJoin) operator, which can be used as a building block to implement a broad variety of notions of similarity (e.g., edit similarity, Jaccard similarity, generalized edit similarity, hamming distance, soundex, etc.) as well as similarity based on co-occurrences.

In one example, the SSJoin operator exploits the observation that set overlap can be used effectively to support a variety of similarity functions. The SSJoin operator compares values based on "sets" associated with (or explicitly constructed for) each one of them. Optionally, the design and implementation of this logical operator can leverage the existing set of relational operators, and can help define a rich space of alternatives for optimizing queries involving similarity joins.

In this example, the SSJoin operator applies on two relations R and S both containing columns A and B. A group of R.B values in tuples sharing the same R.A value constitutes the set corresponding to the R.A value. The SSJoin operator returns pairs of distinct values <R.A, S.A> if the overlap of the corresponding groups of R[B] and S[B] values is above a threshold (e.g., user-specified).

The system includes a mapping component that maps strings to sets. The mapping component can employ any suitable method of mapping a string to a set (e.g., the set of words partitioned by delimiters, the set of all substrings of length q—its constituent q-grams, etc.).

The system further includes a set similarity join component that provides a similarity join output based, at least in part, upon a set overlap between the sets mapped by the mapping component. Given two sets $s_1$, $s_2$, their overlap similarity, denoted Overlap($s_1$, $s_2$), can be defined to be the weight of their intersection—$wt(s_1 \cap s_2)$. The overlap similarity between two strings, $\sigma_1$, $\sigma_2$, Overlap($\sigma_1$, $\sigma_2$) is defined as Overlap(Set($\sigma_1$), Set($\sigma_2$)).

In one example, the SSJoin operator can be described as follows. Consider relations R(A, B) and S(A, B) where A and B are subsets of columns. Each distinct value $a_r \in R.A$ defines a group, which is the subset of tuples in R where $R.A = a_r$. This set of tuples can be called Set($a_r$). Similarly, each distinct value $a_s \in S.A$ defines a set Set($a_s$). The simplest form of the SSJoin operator joins a pair of distinct values <$a_r$, $a_s$>, $a_r \in R.A$ and $a_s \in S.A$, if the projections on column B of the sets Set($a_r$) and Set($a_s$) have a high overlap similarity. The formal predicate is Overlap($\pi_B$(Set($a_r$)), $\pi_B$ (Set($a_s$))) $\geq \alpha$ for some threshold $\alpha$. Overlap($\pi_B$(Set($a_r$)), $\pi_B$ (Set($a_s$))) can be denoted Overlap$_B$ ($a_r$, $a_s$) $\geq \alpha$.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

BRIEF DESCRIPTION OF THE DRAWINGS

FIG. 2 is a diagram illustrating two relations R and S.

DETAILED DESCRIPTION

Figure 1:
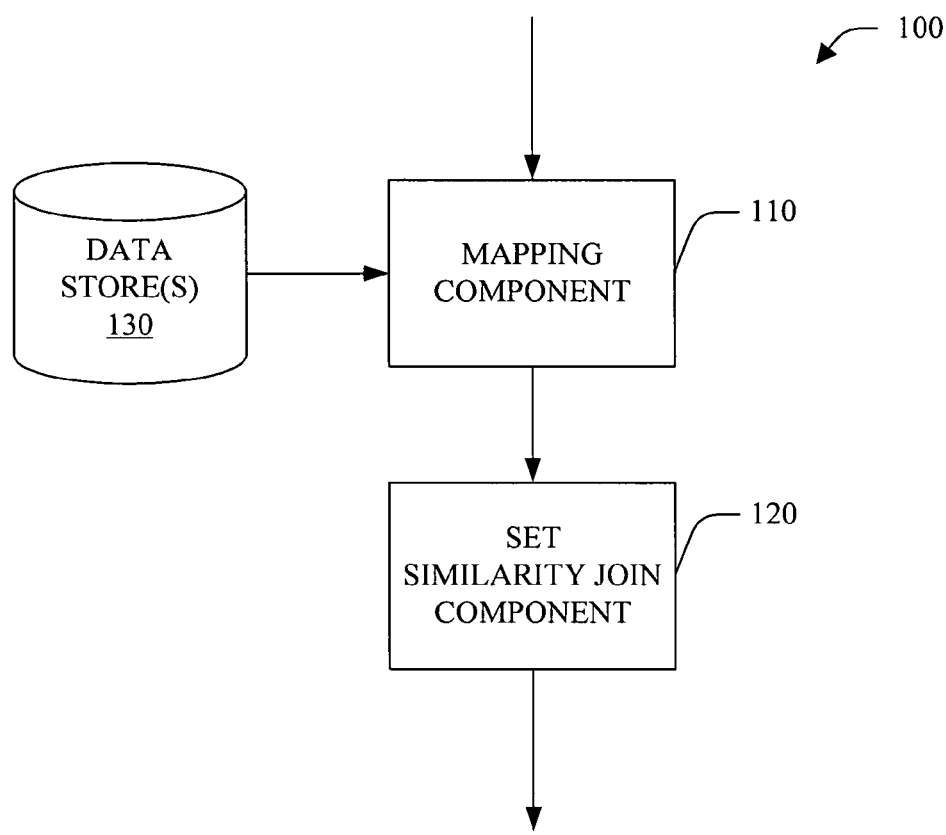
FIG. 1 is a block diagram of a similarity join system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Referring to FIG. 1, a set similarity join system 100 is illustrated. The system 100 can be employed to facilitate data cleaning based on similarities through the identification of "close" tuples (e.g., records and/or rows). As discussed below, "closeness" can be is evaluated using a similarity function(s) (e.g., chosen to suit the domain and/or application). Conventional approaches have been tightly tied to a particular similarity function—however, no single string similarity function is known to be the overall best similarity function. The system 100 facilitates generic domain-independent data cleansing. For example, the characteristics of an effective similarity function for matching products based on their part names where the errors are usually spelling errors would be different from those matching street addresses because even small differences in the street numbers such as "148th Ave" and "147th Ave" are crucial, and the soundex function for matching person names.

The "similarity join" of two relations R and S both containing a column A is the join $R \bowtie_\theta S$ where the join predicate $\theta$ is $f(R.A; S.A) > \alpha$, for a given similarity function $f$ and a threshold $\alpha$. Although similarity joins may be expressed in SQL by defining join predicates through user-defined functions (UDFs), the evaluation would be very inefficient as database systems usually are forced to apply UDF-based join predicates only after performing a cross product. Consequently, specialized techniques have been developed to efficiently compute similarity joins. However, these methods are customized to particular similarity functions.

The system 100 facilitates a general purpose data cleaning platform which can efficiently support similarity joins with respect to a variety of similarity functions. For example, the system 100 can be employed with a foundational primitive, the set similarity join (SSJoin) operator, which can be used as a building block to implement a broad variety of notions of similarity (e.g., edit similarity, Jaccard similarity, generalized edit similarity, hamming distance, soundex, etc.) as well as similarity based on co-occurrences.

As described herein, the SSJoin operator exploits the observation that set overlap can be used effectively to support a variety of similarity functions. The SSJoin operator compares values based on "sets" associated with (or explicitly constructed for) each one of them. As discussed in greater detail below, optionally, the design and implementation of this logical operator can leverage the existing set of relational operators, and can help define a rich space of alternatives for optimizing queries involving similarity joins.

In this example, the SSJoin operator applies on two relations R and S both containing columns A and B. The group of all R.B values in tuples sharing the same R.A value constitutes the set corresponding to the R.A value. The SSJoin operator returns pairs of distinct values (R.A, S.A) if the overlap of the corresponding groups of R[B] and S[B] values is above a threshold (e.g., user-specified). For example, consider two relations R[state; city] and S[state; city]. If A=state and B=city, the SSJoin operator can return pairs of (R.state, S.state) values if the overlap between sets of cities which occur with each state is greater than a threshold. So, the system 100 can return the pairs ('washington', 'wa') and ('wisconsin', 'wi') because the sets of cities within these groups overlap significantly.

The system 100 includes a mapping component 110 that maps strings to sets. The system 100 further includes a set similarity join component 120 that provides a similarity join output based, at least in part, upon a set overlap between the sets mapped by the mapping component 110.

The mapping component 110 can employ any suitable method of mapping a string to a set (e.g., the set of words partitioned by delimiters, the set of all substrings of length q—its constituent q-grams, etc.). For example, the string "Microsoft Corporation" can be treated as a set of words {'Microsoft', 'Corp'}, or as a set of 3-grams, {'Mic', 'icr', 'cro', 'ros', 'oso', 'sof', 'oft', 'ft ', 't C', 'Co', 'Cor', 'orp'}. For purposes of discussion, the set corresponding to a string σ can be referred to as Set(σ). The mapping component 110 can map the string to set using any suitable method. Hereinafter, the focus will be on multi-sets. For purposes of brevity, whenever sets are referenced multi-sets are meant. Hence, when the union and intersection of sets is referred to, the multi-set union and multi-set intersection, respectively, are meant.

Optionally, the mapping component 110 can support weighting. That is, in general, elements can be associated with weights. Weighting can capture the intuition that different portions of a string have different importance. For example, in the string "Microsoft Corp", it may be desirous to associate more importance to the portion "Microsoft". One method of associating weights to set elements is Inverse Document Frequency (IDF) commonly used in Information Retrieval. Those skilled in the art will recognize that there are many methods of associating weights to set elements and all such methods are intended to fall within the scope of the hereto appended claims.

For purposes of explanation, it will be assumed that the weight associated with an element of a set, such as a word or q-gram, is fixed and that it is positive. Formally, all sets are assumed to be drawn from a universe U. Each distinct value in U is associated with a unique weight. The weight of a set s is defined to be the sum of the weights of its members and is denoted as wt(s). For purposes of brevity, hereinafter weighted sets will be discussed, noting that in the special case when all weights are equal to 1, it is reduced to the unweighted case.

Given two sets $s_1$, $s_2$, their overlap similarity, denoted Overlap($s_1$, $s_2$), can be defined to be the weight of their intersection—wt($s_1 \cap s_2$). The overlap similarity between two strings, $\sigma_1$, $\sigma_2$, Overlap($\sigma_1$, $\sigma_2$) is defined as Overlap(Set($\sigma_1$), Set($\sigma_2$)).

Given relations R and S, each with string valued attribute A, consider the similarity join between R and S that returns pairs of tuples where the overlap similarity between R.A and S.A is above a certain threshold. It is expected that when two strings are substantially similar (e.g., "almost equal"), their overlap similarity is high. The SSJoin operator discussed herein can be used to express this predicate.

For purposes of explanation, the standard relational data model will be employed; however the techniques discussed herein are also applicable to other models which allow inline representation of set valued attributes. Further, it will be assumed that relations are in the First Normal Form, and do not contain set-valued attributes. Additionally, sets and hence the association between a string and its set will also be represented in a normalized manner.

Referring briefly to FIG. 2, two relations R 200 and S 210 are illustrated. A set of rows in relation R 200 represent the association between the string "Microsoft Corp" and its 3-grams. A third column norm denotes the length of the string. Similarly, a set of rows in relation S 210 represent the association between the string "Mcrosoft Corp" and its 3-grams.

In one example, the SSJoin operator can be described as follows. Consider relations R(A, B) and S(A, B) where A and B are subsets of columns. Each distinct value $a_r \in R.A$ defines a group, which is the subset of tuples in R where R.A=$a_r$. This set of tuples can be called Set($a_r$). Similarly, each distinct value $a_s \in S.A$ defines a set Set($a_s$). The simplest form of the SSJoin operator joins a pair of distinct values <$a_r$, $a_s$>, $a_r \in R.A$ and $a_s \in S.A$, if the projections on column B of the sets Set($a_r$) and Set($a_s$) have a high overlap similarity. The formal predicate is Overlap($\pi_B$(Set($a_r$)), $\pi_B$(Set($a_s$)))$\geq \alpha$ for some threshold at Overlap($\pi_B$(Set($a_r$)), $\pi_B$(Set($a_s$))) can be denoted Overlap$_B$($a_r$, $a_s$)$\geq \alpha$.

This can be illustrated through the following example. Let relation R(OrgName; 3-gram) and S(OrgName; 3-gram) shown in FIG. 2 associate the strings "Microsoft Corp" and "Mcrosoft Corp" with their 3-grams. Denoting OrgName by A and 3-gram by B, the SSJoin operator with the predicate OverlapB($a_r$; $a_s$)$\geq$10 returns the pair of strings <"Microsoft Corp", "Mcrosoft Corp"> since the overlap between the corresponding sets of 3-grams is 10.

Additionally and/or alternatively, it may be desirous to express conditions such as: the overlap similarity between the two sets must be at least a specified percentage (e.g., 80%) of the set size. Thus, in the above example, a user can assert that the overlap similarity must be higher than 80% of the number of 3-grams in the string "Microsoft Corp". Further, it may be desirous to be able to assert that the overlap similarity be higher than say 80% of the sizes of both sets.

Definition 1: The SSJoin operator can formally be defined as follows. Consider relations R(A, B) and S(A, B). Let pred be the predicate $\hat{}_i\{\text{Overlap}_B(a_r, a_s) \geq e_i\}$, where each $e_i$ is an expression involving only constants and columns from either R.A or S.A. R SSJoin$_A^{pred}$ S can be employed to denote the following result: $\{<a_r, a_s> \in R.A \times S.A | \text{pred}(a_r, a_s) \text{ is true}\}$. Additionally pred can be written as $\{\text{Overlap}_B(a_r, a_s) \geq e_i\}$.

This can be illustrated through the following examples based on the relationships FIG. 2. The third column Norm denotes the length of the string. In general, the norm can denote either the length of the string, or the cardinality of the set, or the sum of the weights of all elements in the set. Several similarity functions use the norm to normalize the similarity.

As shown in FIG. 2, let relations R(OrgName, 3-gram, Norm) and S(OrgName, 3-gram, Norm) associate the organization names with (1) all 3-grams in each organization name, and (2) the number of 3-grams for each name. For example, the predicate in the SSJoin operator can be instantiated in one of the following ways to derive different notions of similarity: absolute overlap, 1-sided normalized overlap, and/or 2-sided normalized overlap.

With respect to absolute overlap, Overlap$_B$($a_r$, $a_s$)$\geq$10 joins the pair of strings <"Microsoft Corp", "Mcrosoft Corp"> since the overlap between the corresponding sets of 3-grams is 10. Next, for 1-sided normalized overlap, Overlap$_B$(<a, norm>$_r$, (<a, norm>$_s$)$\geq$0.8•R.norm joins the pair of strings <"Microsoft Corp", "Mcrosoft Corp"> since the overlap between the corresponding sets of 3-grams is 10, which is more than 80% of 12. Finally, regarding 2-sided normalized overlap, Overlap$_B$(<a, norm>$_r$, (<a, norm>$_s$)$\geq$\{0.8•R.norm, 0.8•S.norm\} also returns the pair of strings <"Microsoft Corp", "Mcrosoft Corp"> since 10 is greater than 80% of 12 and 80% of 11.

As noted previously, the system 100 includes a set similarity join component 120 that provides a similarity join output based, at least in part, upon a set overlap between the sets mapped by the mapping component 110. Having described how the intuitive notion of set overlap can be used to capture various string similarity functions, several exemplary implementations of the SSjoin operator will be discussed next.

The set similarity join component 120 can utilize one or more string similarity functions. As noted previously, earlier techniques relied on distinct specialized implementations for each similarity function. In contrast, the system 100 relies on the SSJoin operator to perform the bulk of the effort. Thus, in one example, only a few checks have to be performed on the result of the SSJoin operator. Accordingly, both the coding effort for programming these checks and the additional number of such checks is very small.

Figure 3:
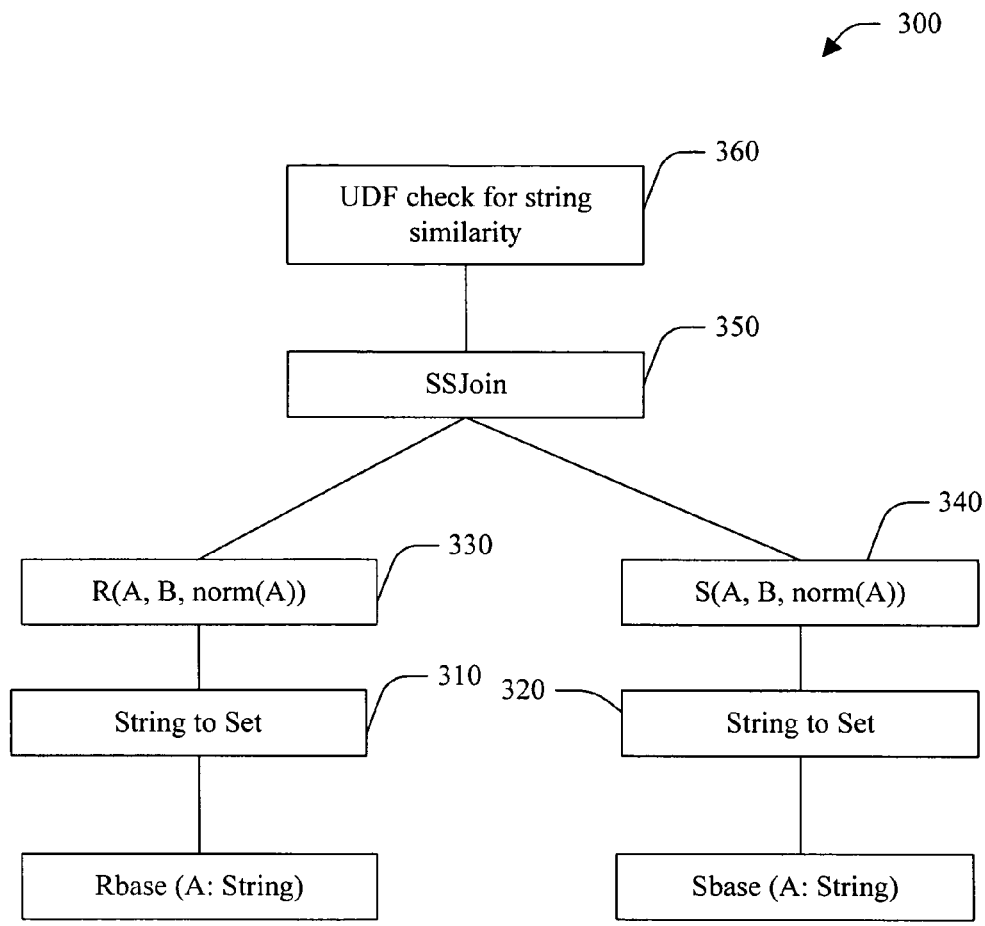
FIG. 3 is a diagram of an operator tree illustrating string similarity join.

Without loss of generality and for clarity in description, unary relations Rbase(A) and Sbase(A) where A is a string-valued attribute are fixed. The goal is to find pairs <Rbase.A, Sbase.A> where the textual similarity is above a threshold α. Referring to FIG. 3, an operator tree 300 illustrating string similarity join is provided. As discussed previously, the mapping component 110 first maps (e.g., converts) the strings Rbase(A) and Sbase(A) to sets 310, 320. Optionally, the mapping component 110 can further construct normalized representations R(A, B, norm(A)) 330 and S(A, B, norm(A)) 340. Thereafter, the similarity join component 110 can operate on the normalized representations, for example, using the SSjoin operator 350 and a UDF that checks for string similarity 360.

In one example, an invocation of the SSJoin operator can be chosen so that all string pairs whose similarity is greater than α are guaranteed to be in the result of the SSJoin operator. Hence, the SSJoin operator provides a way to efficiently produce a small superset of the correct answer. The set similarity join component 120 can then compare the pairs of strings using a similarity function (e.g., declared as a UDF (user-defined function) within a database system), to ensure that only pairs of strings whose similarity is above α are returned.

Note that a direct implementation of the UDF within a database system is most likely to lead to a cross-product where the UDF is evaluated for all pairs of tuples. On the other hand, in one example, an implementation using SSJoin exploits the support within database systems for equi-joins to result in a significant reduction in the total number of string comparisons. This can result in orders of magnitude improvement in performance, as discussed in greater detail below.

Exemplary similarity functions include: edit distance, Jaccard containment and resemblance, generalized edit similarity, co-occurrence, and "soft functional" dependencies. While each of these exemplary similarity functions are described below, those skilled in the art will recognize that the set similarity join component 120 can be employed for similarity joins with any suitable similarity function, and all such similarity functions are intended to be encompassed by the hereto appended claims.

Edit Distance

The edit distance between strings is the least number of edit operations (e.g., insertion and/or deletion of character(s), and/or substitution of a character with another) required to transform one string to the other. For example, the edit distance between strings 'microsoft' and 'mcrosoft' is 1, the number of edits (e.g., deleting 'i') required to match the second string with the first. In one example, the edit distance can be normalized to be between 0 and 1 by the maximum of the two string lengths. Edit similarity can be defined as follows.

Definition 2: Given two strings $\sigma_1$ and $\sigma_2$, the edit distance $ED(\sigma_1, \sigma_2)$ between them is the minimum number of edit operations—insertion, deletion, and/or substitution—to transform $\sigma_1$ into $\sigma_2$. The edit similarity $ES(\sigma_1, \sigma_2)$ can be defined to be:

$$1.0 - \frac{ED(\sigma_1, \sigma_2)}{\max(|\sigma_1|, |\sigma_2|)}.$$

In one example, the set similarity join component 120 can employ the edit similarity function to return pair(s) of records where the edit distance is less than a threshold α (e.g., input threshold). This implementation can be easily extended to edit similarity joins. The following example illustrates the connection between edit distance and overlap. Consider the strings "Microsoft Corp" and "Mcrosoft Corp". The edit distance between the two is 1 (deleting 'i'). The overlap similarity between their 3-grams is 10, more than 80% of the number of 3-grams in either string.

The intuition is q-grams that are "far away" from the place where the edits take place generally must be identical. Hence, if the edit distance is small, then the overlap on q-grams must be high. This intuitive relationship between edit distance and the set of q-grams can be formalized as follows:

Property 1: Consider strings $\sigma_1$ and $\sigma_2$, of lengths $|\sigma_1|$ and $|\sigma_2|$, respectively. Let $QGSet_q(\sigma)$ denote the set of all contiguous q-grams of the string σ. If $\sigma_1$ and $\sigma_2$ are within an edit distance of ∈, then $Overlap(QGSet_q(\sigma_1), QGSet^q(\sigma_2)) \geq \max(|\sigma_1|, |\sigma_2|) - q + 1 - \in \cdot q$.

Figure 4:
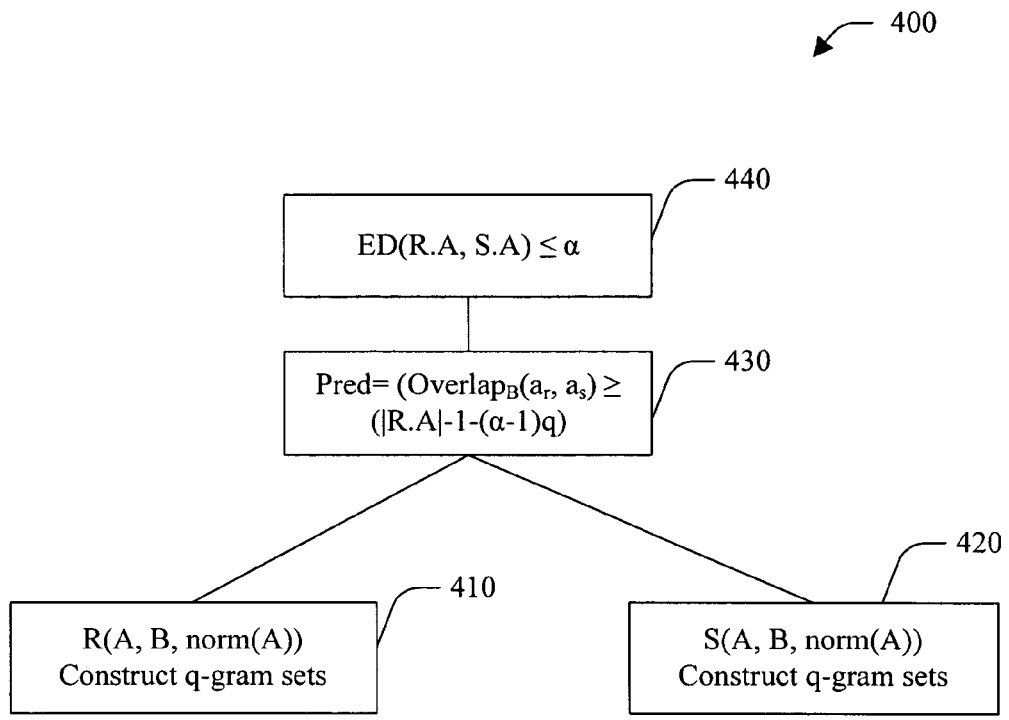
FIG. 4 is a diagram of an operator tree for edit similarity.

Thus, in the above example, the edit distance is 1, and Property 1 asserts that at least 9 3-grams have to be common. Referring to FIG. 4, from the above property, the edit similarity can be implemented with the operator tree 400. First, the relations R(A, B, norm(A)) 410 and S(A, B, norm(A)) 420 containing the norms and q-gram sets for each string are constructed. The SSJoin operator is then invoked over these relations 430 in order to identify <R.A, S.A> pairs which are very similar. Optionally, a filter based on edit similarity 440 (e.g., possibly as a user-defined function) can be employed in order to filter out pairs whose overlap similarity is higher than that given by Property 1 but edit similarity is still less than the required threshold.

Jaccard Containment and Resemblance

The Jaccard containment and resemblance between strings can be defined through the Jaccard containment and resemblance of their corresponding sets. Let $s_1$ and $s_2$ be weighted sets.

1. The Jaccard containment of $s_1$ in $s_2$, $JC(s_1; s_2)$ is defined to be $$\frac{wt(s_1 \cap s_2)}{wt(s_1)}.$$

2. The Jaccard resemblance between $s_1$ and $s_2$, $JR(s_1, s_2)$, is defined to be $$\frac{wt(s_1 \cap s_2)}{wt(s_1 \cup s_2)}.$$

Use the SSJoin operator for Jaccard containment can be illustrated using the following example. In this example, the Jaccard containment between two strings can be defined using the underlying sets of 3-grams. Consider strings $\sigma_1$="Microsoft Corp" and $\sigma_2$="Mcrosoft Corp". A Jaccard containment predicate on these strings translates to a SSJoin predicate.

For example, suppose it is desirous to join the two strings when the Jaccard containment of $\sigma_1$ in $\sigma_2$ is more than 0.8. As shown in FIG. 2 discussed previously, let R(OrgName, 3-gram, norm) and S(OrgName, 3-gram, norm) associate the strings "Microsoft Corp" and "Mcrosoft Corp" with (1) the actual 3-grams in column 3-gram, and (2) the number of 3-grams in column norm. The Jaccard containment predicate is equivalent to the following SSJoin predicate: $Overlap_B$(<a, norm>$_r$, <a, norm>)≧0.8•R.norm.

Figure 5:
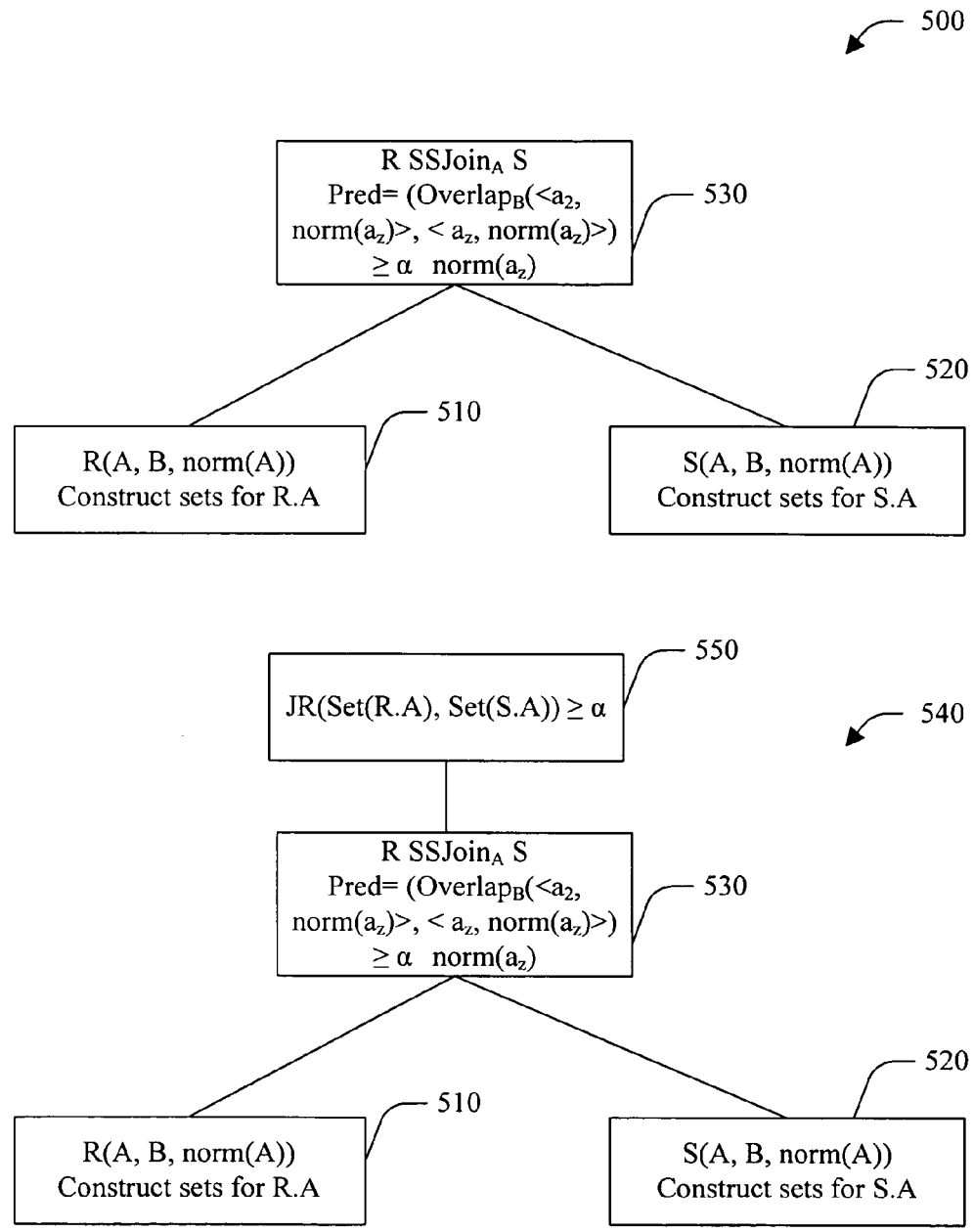
FIG. 5 is a diagram of operator trees for Jaccard containment condition and resemblance joins.

Referring to FIG. 5, an operator tree 500 for the Jaccard containment is illustrated. In general, relations R<A, B, norm (A)> and S<A, B, norm(A)> are constructed from Rbase and Sbase, respectively, that associates a string with (1) the weight of the underlying set, and (2) the set of elements in its underlying set 510, 520. Note that because Jaccard containment 530 like the SSJoin operator measures the degree of overlap, this translation does not require a post processing step.

Observe that for any two sets $s_1$ and $s_2$, $JC(s_1; s_2) \geq JR(s_1; s_2)$. Hence, $JR(s_1; s_2) \geq \alpha \Rightarrow \text{Max}(JC(s_1, s_2), JC(s_2, s_1)) \geq \alpha$. Therefore, as further illustrated by operator tree 540 in FIG. 5, an operator tree for Jaccard containment (e.g., operator tree 500) is used and a check for Jaccard resemblance 550 is added as a post-processing filter. Optionally, a check for the Jaccard containment of JC(R.A, S.A) and JC(S.A, R.A) being greater than a can be employed.

Generalized Edit Similarity

This similarity function is a weighted variant of edit distance. The idea is to address some limitations of plain edit distance, illustrated through the following example. Consider strings "microsoft corp", "microsft corporation" and "mic corp". The edit distance between "microsoft corp" and "mic corp" is less than that between "microsoft corp" and "microsft corporation". So is the case for Jaccard similarity because it only matches tokens that are identical.

To deal with these limitations, with the generalized edit similarity (GES) function, each string is interpreted as a sequence of tokens, through a tokenizing function. The edit operations that transform one sequence into another include insertion, deletion and replacement of one token with another. Each edit operation is associated with a cost dependent on the tokens (and their weights) involved in the edit. To illustrate, consider the above example strings. The strings "microsoft corp" and "microsft corporation" are close because 'microsoft' and 'microsft' are close according to edit distance and the weights of 'corp' and 'corporation' are relatively small owing to their high frequency.

GES has been shown to be very effective for matching erroneous tuples with their correct counterparts. Let $ed(\sigma_1, \sigma_2)$ denote the absolute edit distance normalized by the maximum of the strings lengths, that is:

$$ed(\sigma_1, \sigma_2) = \frac{ED(\sigma_1, \sigma_2)}{\max(|\sigma_1|, |\sigma_2|)}.$$

Accordingly, let $\sigma_1$ and $\sigma_2$ be two strings. The cost of transforming a token t1 in the set $\text{Set}(\sigma_r)$ of tokens corresponding to $\sigma_1$ to a token $t_2$ in $\text{Set}(\sigma_2)$ is $ed(t_1, t_2) \cdot wt(t1)$. The cost of inserting or deleting a token t equals $wt(t)$. The cost $tc(\sigma_1, \sigma_2)$ of transforming or to $\sigma_1$ to $\sigma_2 2$ is the minimum cost transformation sequence for transforming $\sigma_1$ into $\sigma_2$.

The generalized edit similarity $GES(\sigma_1, \sigma_2)$ is defined as follows:

$$GES(\sigma_1, \sigma_2) = 1.0 - \left(\frac{tc(\sigma_1, \sigma_2)}{wt(\text{Set}(\sigma_1))}, 1.0\right).$$

The connection between GES and the SSJoin predicate can be illustrated with the following example. Consider strings $\sigma_1$="Microsoft Corp" and $\sigma_2$="Mcrosoft Corp". Consider the sets $\text{Set}(\sigma_1)$={Microsoft, Corp} and $\text{Set}(\sigma_2)$={Mcrosoft, Corp} obtained using the tokenizing function and ignoring the sequentiality among tokens. Suppose, Set $(\sigma_1)$ is expanded to ExpandedSet$(\sigma_1)$={Microsoft, Mcrosoft, Macrosoft, Corp} by including tokens (e.g., from a dictionary) whose edit similarity with any token in Set$(\sigma_1)$ is high. Then, the overlap between ExpandedSet $(\sigma_1)$ and Set$(\sigma_2)$ is high.

The above example illustrates the basic intuition. Informally, the expansion adds to a set corresponding to R.A all tokens from a dictionary (e.g., all tokens in any attribute value of S.A) whose edit similarity with any token in the set is greater than a threshold $\beta$ ($<\alpha$). If the generalized edit similarity between the strings $\sigma_1$ and $\sigma_2$ is higher than a then the overlap between their expanded sets must be higher than $\alpha-\beta$. The intuition is that the cost of transforming any token $t_1$ in Set$(\sigma_1)$ to a token $t_2$ in Set$(\sigma_2)$ is either (i) less than $\beta$ if there is an overlapping token $t_0$ between the expanded sets that is close to both $t_1$ and $t_2$, or (ii) greater than $\beta$, otherwise. Therefore, the similarity is bounded by $\alpha-\beta$ if the overlap is greater than $\alpha$. In general, both sets Set$(\sigma_1)$ and Set$(\sigma_2)$ can be expanded by including similar tokens.

Beyond Textual Similarity

As noted previously, the system 100 (and the SSJoin operator discussed herein) can perform similarity joins based upon non-textual similarity. For example, (1) "co-occurrence" between columns; and, (2) soft functional dependencies. Both of the following examples are based on an example publication database involving tables storing papers and authors.

Using Co-occurrence

Consider two tables, from different sources that are being integrated, of author names joined with the titles of the papers, with the schema <ptitle, aname>. To facilitate a unified view of all authors, identification of author names that are like to represent the same author is desired. If the naming conventions in the two sources are entirely different, it is quite likely that the textual similarity between the author names is only a partial indicator of their similarity. Accordingly, alternative sources of information for identifying duplicate author entities can be employed by the system 100.

Figure 6:
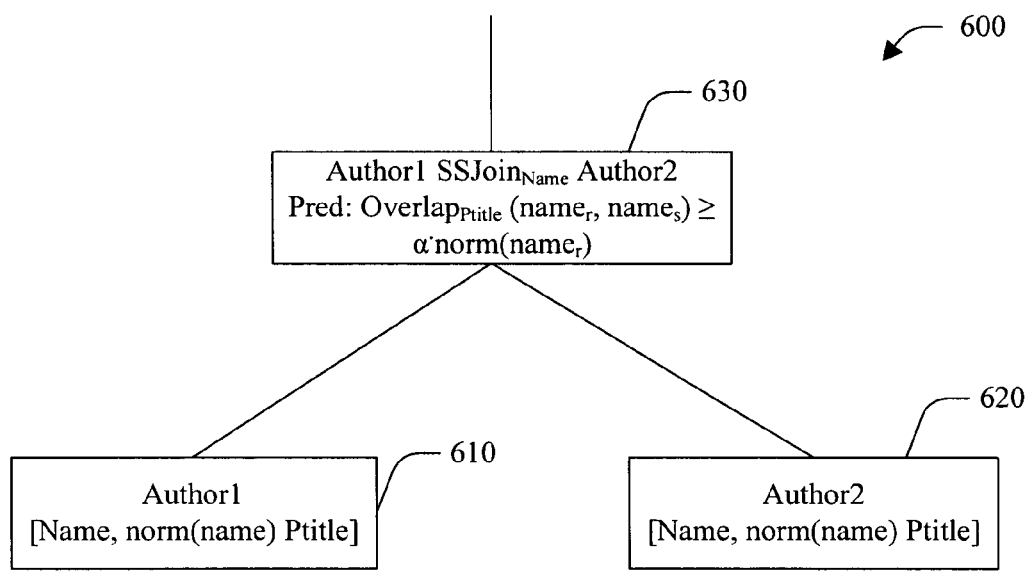
FIG. 6 is a diagram of an operator tree for co-occurrence join using SSJoin.

In this instance, the set of paper titles associated with each author can be employed to identify authors. The idea is that if two authors are the same, then the set of paper titles co-occurring with them must have a large overlap. This can be expressed using Jaccard containment, for instance, which translates directly into the SSJoin operator, as shown in an operator tree 600 in FIG. 6. The SSJoin operator 630 is employed to identify duplicates from two relations 610, 620. Co-occurrence has been shown to be very effective for identifying approximate duplicates. The next example illustrates how functional dependencies can be exploited for approximate equality.

Using Soft Functional Dependencies

Another source of identifying duplicate information is soft functional dependencies (FDs), which may not hold on the entire relation but over a large subset of the relation. The SSJoin FDs may not hold exactly for a variety of reasons: they may not have been enforced due to efficiency reasons, or the relation may be the union of relations from several independent sources. For example, a large percentage of emails (if they are valid) uniquely determine the author tuple. In general, if is desired to use the functional dependency X→A to identify two similar values of R.A, then an equi-join on R.X can be performed.

The question arises how multiple FDs can be exploited. Informally, two tuples agreeing on the source attributes of several FDs indicate that the target attribute values are the same. One natural way to aggregate the information from multiple functional dependencies is to use majority vote. This can be formalized as follows. Let $\{X_1, \ldots, X_h, A\}$ be a set of columns in R and S. Each $X_i$ is expected to functionally determine A.

For two tuples $t_1$ and $t_2$ in R, $t_1 \approx_{FD}^{K/h} t_2$ if $t_1$ and $t_2$ agree on at least k out of the h $X_i$. For example, consider two relations Authors1, Author2, both with the schema {name, address, city, state, zip, email, phone}. The desire to join two author name if at least tow of the following agree: address, email, phone can be expressed as $Author1 \approx_{FD}^{2/3} Author2$.

Figure 7:
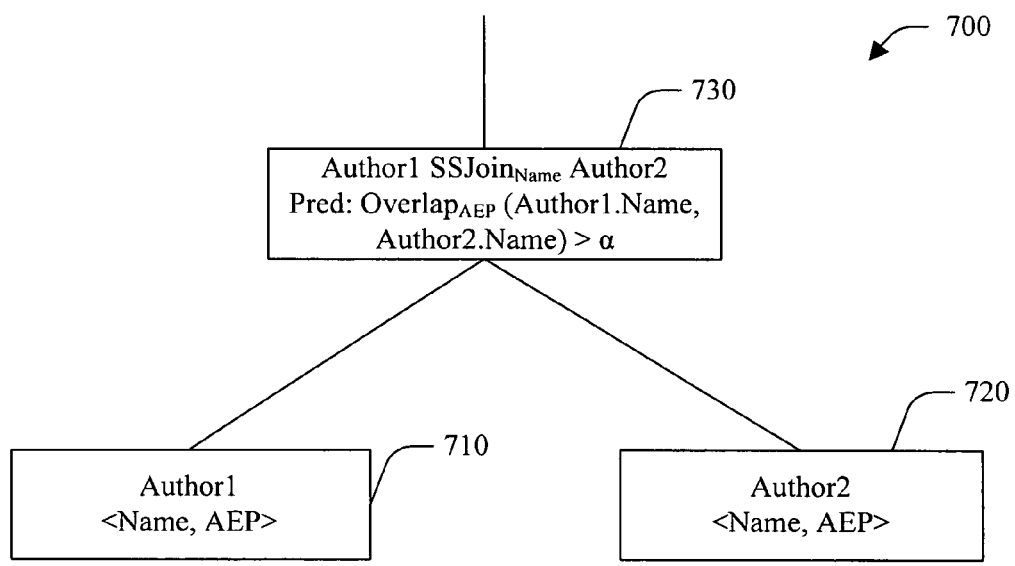
FIG. 7 is a diagram of an operator tree for functional dependencies join using SSJoin.

The system 100 can compute the $\approx_{FD}^{k/h}$ predicate using the above example. By associating each author name with a set of ordered pairs <Column, Value> and normalizing the resulting relation, a relation with the schema Name, AEP (AEP for address-email-phone) can be obtained. The system 100 can implement the above predicate (e.g., through the SSJoin operator) as shown in an operator tree 700 of FIG. 7 in which an SSJoin operator 730 is employed to identify similar tuples from two relations 710, 720.

Implementation of the SSJoin Operator

Various strategies for implementing the SSJoin operator are discussed below. Each of these strategies can be implemented using relation operators. The idea is to exploit the property that SSJoin has to only return pairs of groups whose similarity is above a certain threshold, and that thresholds are usually high. For purposes of explanation, executing the operation R $SSJoin_A^{pred}$ over relations R(A, B) and S(A, B) where the predicate is $Overlap_B(a_r, a_s) \geq \alpha$ for some positive constant $\alpha$ will generally be discussed. The implementation extends to the case when $Overlap_B(a_r, a_s)$ is required to be greater than a set of expressions.

Basic SSJoin Implementation

Figure 8:
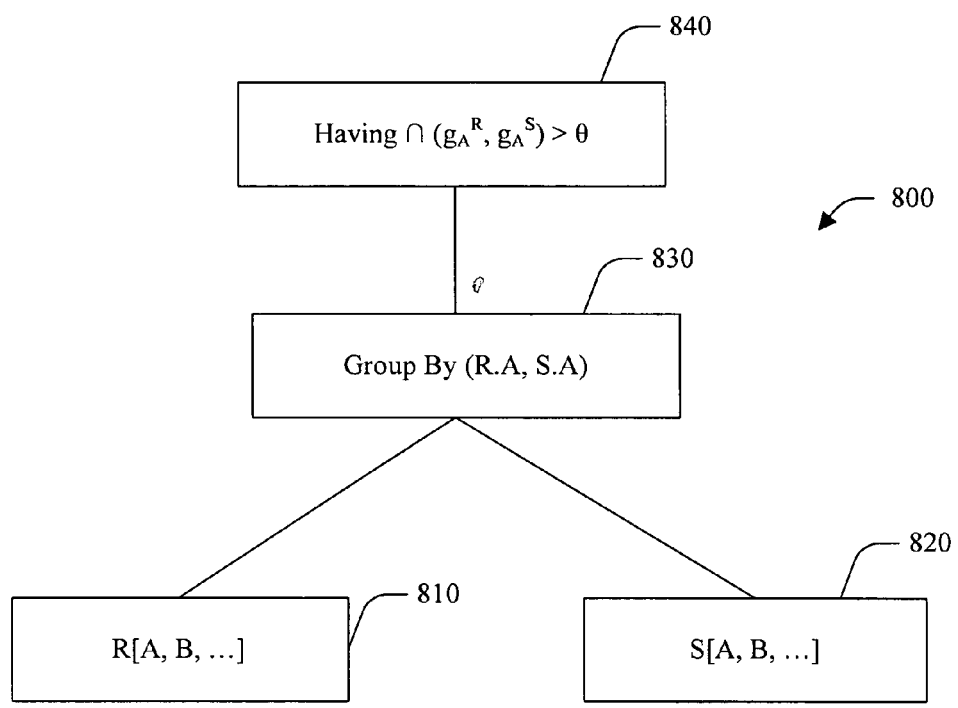
FIG. 8 is a diagram of an operator tree for basic overlap SSJoin.

Since $\alpha > 0$, it can be concluded that for a pair $<a_r, a_s>$ to be returned, at least one of the values in the column B related to $a_r$ and $a_s$ must be the same. Indeed, by computing an equi-join on the B column(s) between R and S and adding the weights of all joining values of B, the overlap between groups on R.A and S.A can be computed. FIG. 8 presents an operator tree 800 for implementing the basic overlap-SSJoin. The equi-join between R 810 and S 820 is first computed on the join condition R.B=S.B 830. Any <R.A, S.A> pair whose overlap is non-zero would be present in the result. Grouping the result on <R.A, S.A> and ensuring, through the having clause 840, that the overlap is greater than the specified threshold al yields the result of the SSJoin.

The size of the equi-join on B varies widely with the joint-frequency distribution of B. Consider the case when the SSJoin operator is used to implement the Jaccard similarity between strings. Here, the values in the attribute B represent tokens contained in strings. Certain tokens like "the" and "inc" can be extremely frequent in both R and S relations. In such scenarios, which occur often, the size of the equijoin on B is very large, as discussed below. The challenge, therefore, is to reduce the intermediate number of <R.A, S.A> groups compared. One approach to address this problem is a filtered SSJoin implementation.

Filtered SSJoin Implementation

The intuition exploited is that when two sets have a large overlap, even smaller subsets of the base sets overlap. To make the intuition concrete, consider the case when all sets are unweighted and have a fixed size h. The following property can be observed: Let $s_1$ and $s_2$ be two sets of size h. Consider any subset $r_1$ of $s_1$ of size h−k+1. If $|s_1 \cap s_2| \geq k$, then $r_1 \cap s_2 \neq \Phi$ For instance, consider the sets $s_1 = \{1,2,3,4,5\}$ and $s_2 = \{1,2,3,4,6\}$ which have an overlap of 4. Any subset of $s_1$ of size 2 has a non-zero overlap with the set $s_2$. Therefore, instead of performing an equi-join on R and S, the system 100 can ignore a large subset of S and perform the equi-join on R and a small filtered subset of S. By filtering out a large subset of S, the system 100 can reduce, often by very significant margins, the size of the resultant equi-join.

In one example, such a prefix-filter can be applied to both relations R and S in the equi-join. This can be illustrated as follows. Fix an ordering O of the universe U from which all set elements are drawn. Define the k-prefix of any set s to be the subset comprising the first k elements as per the ordering O. Now, if $|s_1 \cap s_2| \geq k$, then their (h−k+1)-prefixes must intersect. For example, consider $s_1 = \{1, 2, 3, 4, 5\}$ and $s_2 = \{1, 2, 3, 4, 6\}$ as before. Assume the usual ordering of natural numbers. Since the overlap between $s_1$ and $s_2$ is 4, their size (5−4+1)=2-prefixes must intersect, which is the case—the size-2 pre-fixes of both $s_1$ and $s_2$ is $\{1, 2\}$. Therefore, an equi-join on B on the filtered relations returns all pairs that satisfy the SSJoin predicate. The result would be a superset of all pairs of <R.A, S.A> groups with overlap greater than the given threshold. And, the number of candidate groups of pairs is significantly (sometimes, by orders of magnitude) smaller than the number of pairs from the equi-join on the full base relations as discussed below.

This intuition can be extended to weighted sets. Consider any fixed ordering O of the domain from which R.B and S.B are drawn. Given a weighted set r drawn from this domain, define $\text{prefix}_\beta(r)$ to be the subset corresponding to the shortest prefix (in sorted order), the weights of whose elements add up to more than $\beta$. This yields the following result:

Lemma 1: Consider two weighted sets $s_1$ and $s_2$, such that $wt(s_1 \cap s_2) \geq \alpha$. Let $\beta_1 = wt(s_1) - \alpha$. Then $\text{prefix}_{\beta_1}(s_1) \cap \text{prefix}_{\beta_2}(s_2) \neq \Phi$.

Suppose that for the set defined by value $a_r \in R.A$, $Set(a_r)$ (respectively for $a_s \in S.A$), the system 100 extracts a extract a $\beta_{ar} = (wt(Set(a_r)) - \alpha)$ prefix under O (respectively, a $\beta_{as}$, prefix). From the above lemma, performing the equi-join B on the resulting relations results in a superset of the result of the SSJoin. The system 100 can then check the SSJoin predicate on the pairs returned. Since the filter is letting only a prefix under a fixed order to pass through, this filter can be called the prefix-filter. The relation obtained by filtering R can be referred to as prefix-filter (R, $\alpha$).

Figure 9:
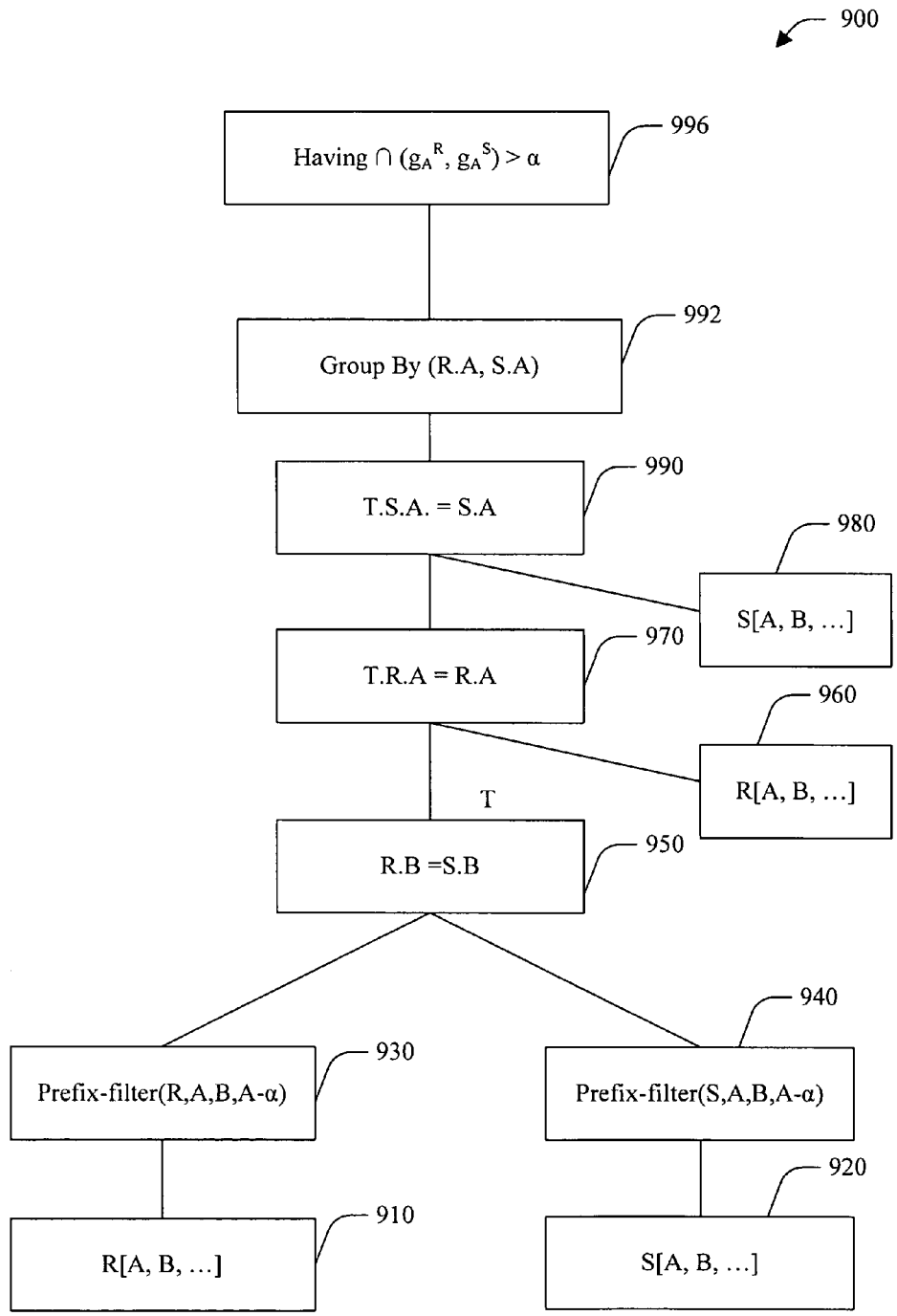
FIG. 9 is a diagram of an operator tree for a prefix-filter implementation of SSJoin.

An operator tree 900 illustrating the filtered overlap implementation of the SSJoin operator is illustrated in FIG. 9. The prefix-filtered relations 930, 940 are first joined to obtain candidate pair <R.A, S.A> groups 950 to be compared. The candidate set of pairs are then joined with the base relations R 960 and S 980 in order to obtain the groups 970, 990 so that the overlap between the groups can be computed. The actual computation of the overlap can be done by grouping on <R.A, S.A> 992 and filtering out groups whose overlap is less than $\alpha$ 996.

Those skilled in the art will recognize that this implementation can be extended to address the following issues:

Normalized Overlap, Predicates: Instead of a constant $\alpha$ as in the discussion above, an expression of the form $\alpha \cdot R.Norm$ is involved. The system 100 extracts $\beta_{ar,\, norm(ar)} = ((wt((Set(a_r)) - \alpha \cdot norm(a_r))$ prefix of the set $Set(a_r)$. This generalizes to the case when an expression involving constants and R.Norm are involved.

For a 2-sided normalized overlap predicate $Overlap_B(a_r, a_s) \geq \alpha \cdot Max(R.Norm, S.Norm)$, the system 100 applies different prefix-filter to relations R and S. The system 100 applies the filter prefix-filter(R, $\alpha \cdot R.Norm$) to R and prefix-filter(S, $\alpha \cdot S.Norm$) to S.

For the evaluation of a 1-sided normalized overlap predicate Overlap$_B$(a$_r$, a$_s$)≧α•R.Norm, the system 100 can apply the prefix-filter only on sets in R.

Prefix-filter Approach

Mapping Multi-set Intersection to Joins

Observe that the form of predicate considered here involves multi-set intersection when any R.A (or S.A) group contains multiple values on the R.B attributes. In order to be able to implement them using standard relational operators, the system 100 can convert these multi-sets into sets; each value in R.B and S.B is converted into an ordered pair containing an ordinal number to distinguish it from its duplicates. Thus, for example, the multi-set {1, 1, 2} can be converted to {<1, 1>, <1, 2>, <2, 1>}. Since set intersections can be implemented using joins, the conversion enables the system 100 to perform multi-set intersections using joins.

Determining the Ordering

Note that the prefix-filter is applicable regardless of ordering O picked. However, the ordering picked can have performance implications. Thus, in one example, a goal to pick an ordering that minimizes the number of comparisons that the ordering implies. A first natural candidate is to order the elements by increasing order of their frequency in the database. This way, the system 100 tries to eliminate higher frequency elements from the prefix filtering and thereby expect to minimize the number of comparisons. Since many common notions of weights (e.g., IDF) are inversely proportional to frequency, the system 100 can implement this using the element weights. Optionally, optimization(s) such as the extent to which prefix-filtering helps, whether it is worth the cost of producing the filtered relations, whether partitioning the relations and using different approaches for different partitions should occur, etc.

In one implementation, R.B values are order with respect to their IDF weights. Since high frequency elements have lower weights, they are filtered out first. Therefore, the size of the subset (and hence the subsequent join result) let through would be very small under this ordering.

The Prefix-filter

In one example, the prefix-filter can be implemented using a combination of standard relational operators (e.g., group by, order by, and join etc.), and the notion of groupwise processing where groups of tuples are iteratively processed (defined as in group-by, that is, where every distinct value in a grouping column constitutes a group) and the a subquery is applied on each group. In this example, the tuples of R can be grouped on R.A and the subquery can compute the prefix of each group it processes. In this example, a server-side cursor which requires the scan of the base relation R ordered on A, B can be used. While scanning, the prefix of each group Set(a$_r$) can be marked. Those skilled in the art will observe that ordering R.B with respect to the fixed order O of R.B may require an additional join of R with the "order" table.

Inlined Representation of Groups

A property of the prefix-filter approach is that when the system 100 extracts the prefix-filtered relations, the original groups are lost. Since the original groups are required for verifying the SSJoin predicate, a join can be performed with the base relations again in order to retrieve the groups, as shown in FIG. 9. For example, these joins can add substantially to the cost of the SSJoin operation.

Figure 10:
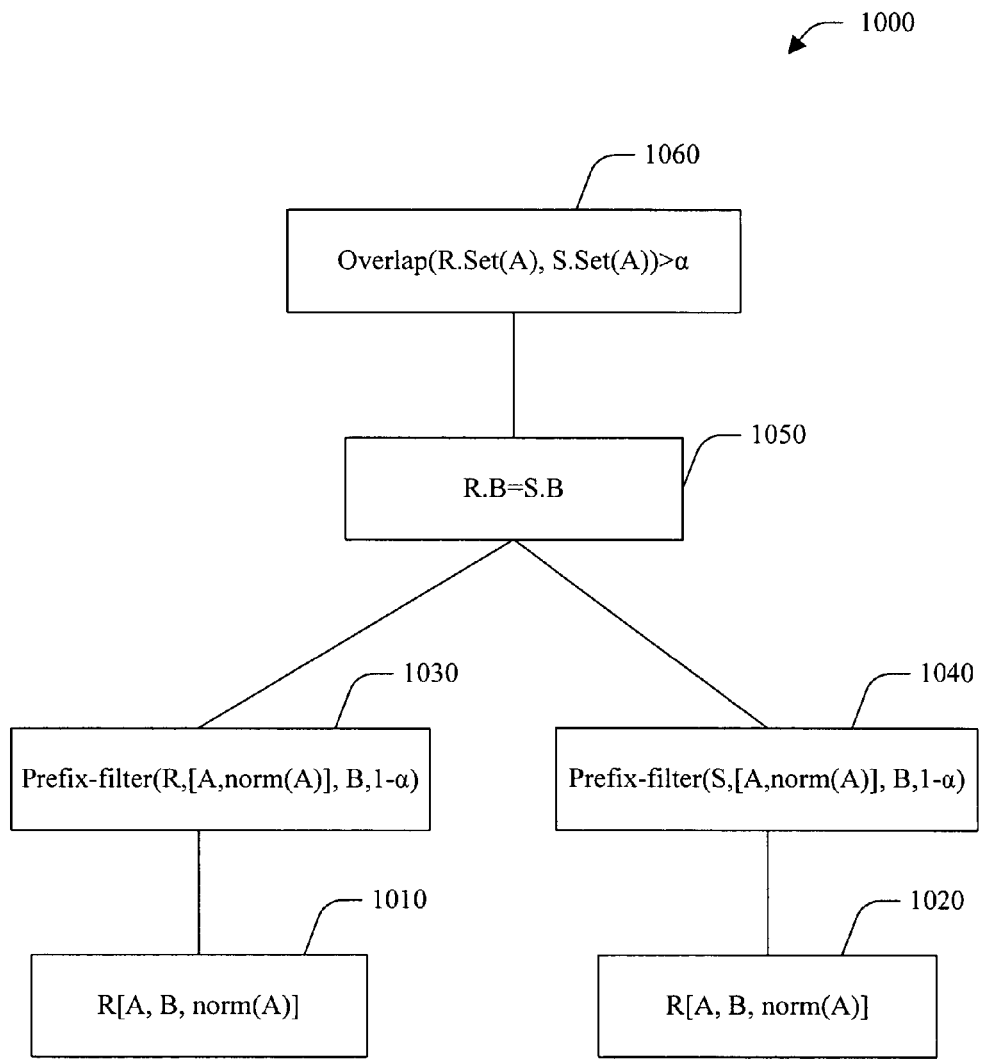
FIG. 10 is a diagram of an operator tree for a prefix-filter with inline set representation.

Optionally, the system 100 can employs an implementation which can avoid these joins. The idea is to "carry" the groups along with each R.A and S.A value that pass through the prefix-filter. Accordingly, the joins with the base relations can be avoided. The intuition is illustrated in FIG. 10 which provides an operator tree 1000 for a prefix-filter with inline set representation. Two normalized relations 1010, 1020 are prefix filtered 1030, 1040. Thereafter, the prefix filtered relations are joined to obtain candidate pair groups to be compared 1050. Finally, set similarity overlap is calculated 1060. In one example, in order to do so, the system 100 requires the capability to define a set-valued attribute and/or a method to encode sets as strings or clobs (e.g., by concatenating all elements together separating them by a special marker).

In one implementation, the latter option is chosen. Now, measuring the overlap between <R.A, S.A> groups can be done without a join with the base relations. However, a function (e.g., UDF) can be employed for measuring overlap between inlined sets. This implementation goes beyond the capabilities of standard SQL operators as it requires the system 100 to compute set overlaps. However, the UDF employed can be a simple unary operator that does not perform very sophisticated operations internally, especially when the sets are bounded. This can result greater efficiency since redundant joins are avoided.

It is to be appreciated that the system 100, the mapping component 110 and/or the set similarity join component 120 can be computer components as that term is defined herein.

Figure 11:
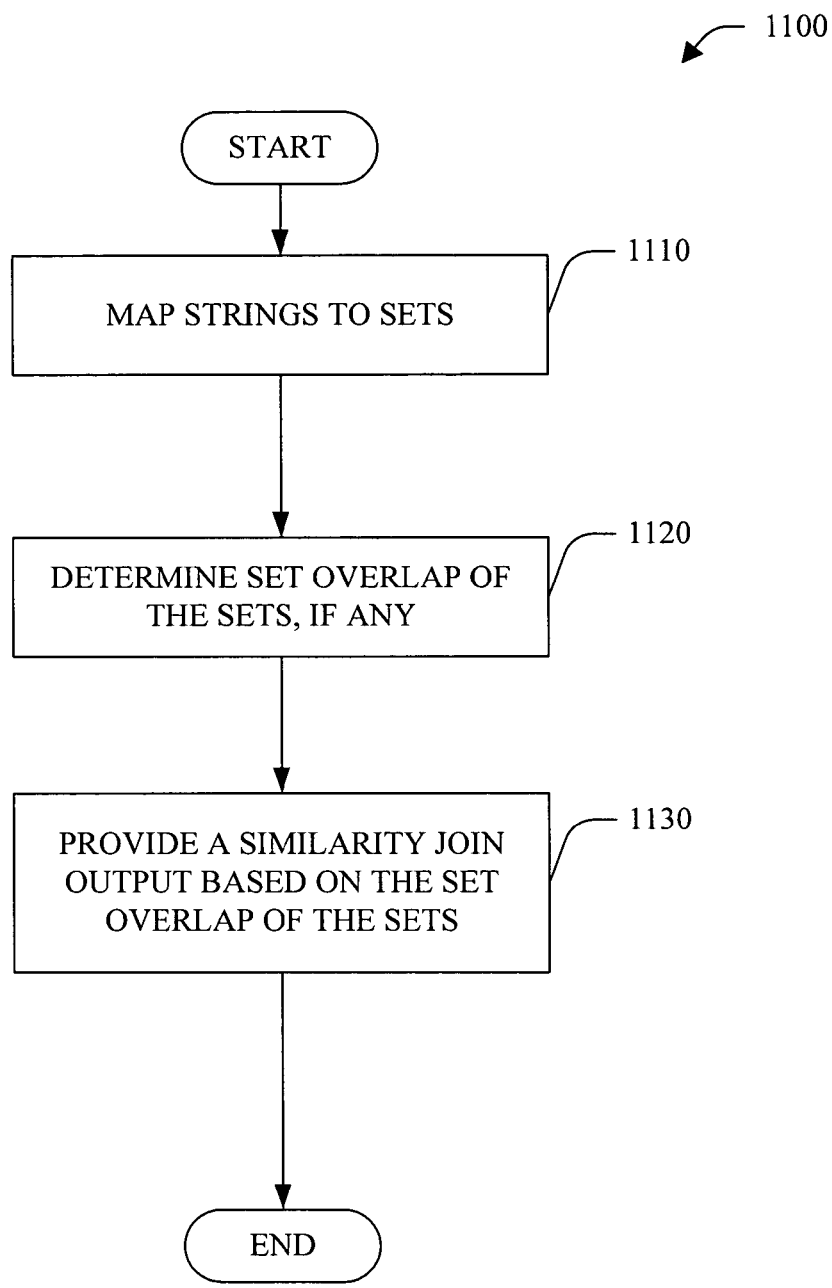
FIG. 11 is a flow chart of a set similarity join method.

Turning briefly to FIG. 11, a methodology that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodology.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 11, a set similarity join method 1100 is illustrated. At 1110, strings are mapped to sets (e.g., by a mapping component 110). Next, at 1120, set overlap of the sets, if any, is determined (e.g., by a set similarity join component 120). At 1130, a similarity join output based on the set overlap of the sets is provided.

Figure 12:
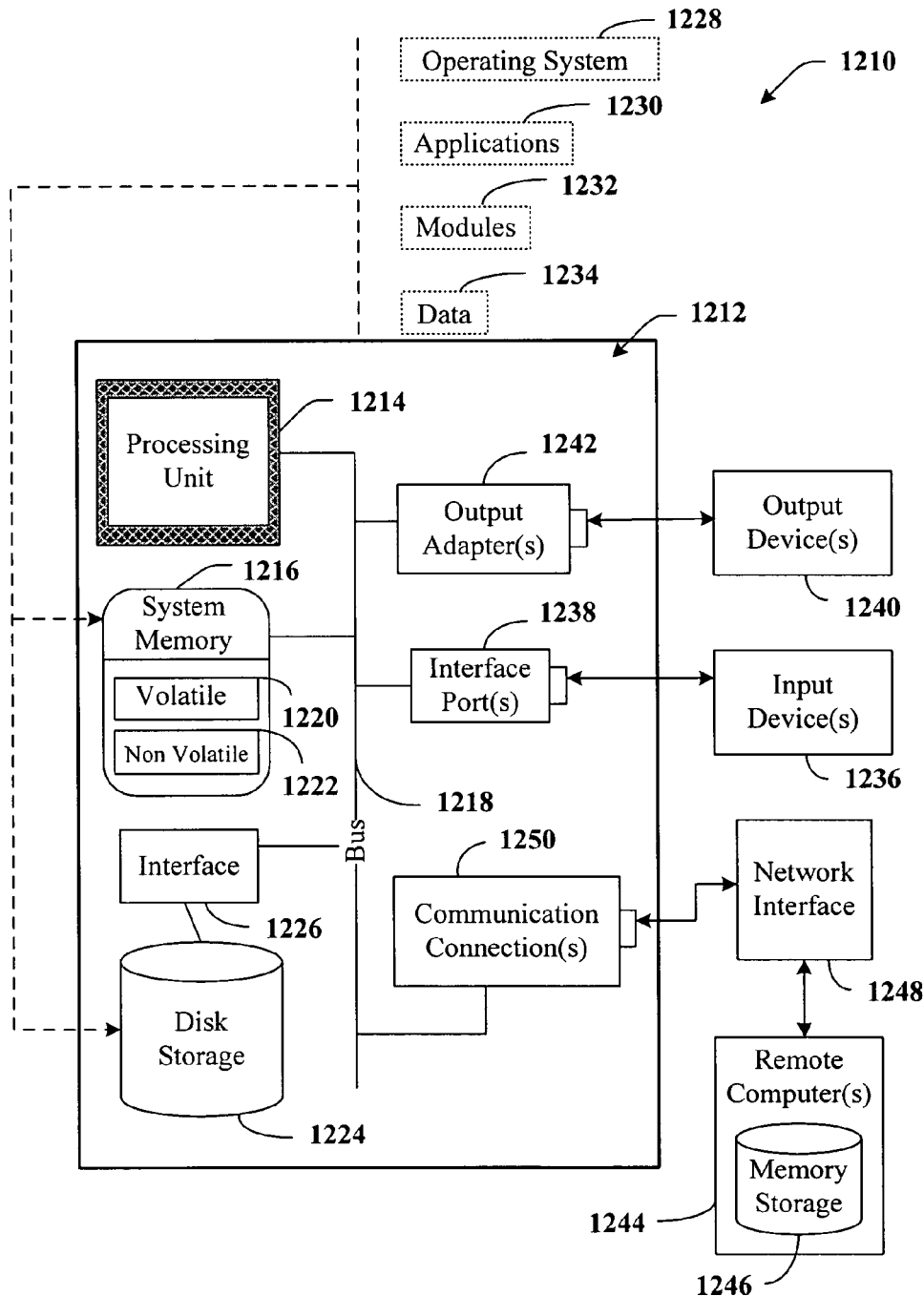
FIG. 12 illustrates an example operating environment.

In order to provide additional context for various aspects of the claimed subject matter, FIG. 12 and the following discussion are intended to provide a brief, general description of a suitable operating environment 1210. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 1210 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 12, an exemplary environment 1210 includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
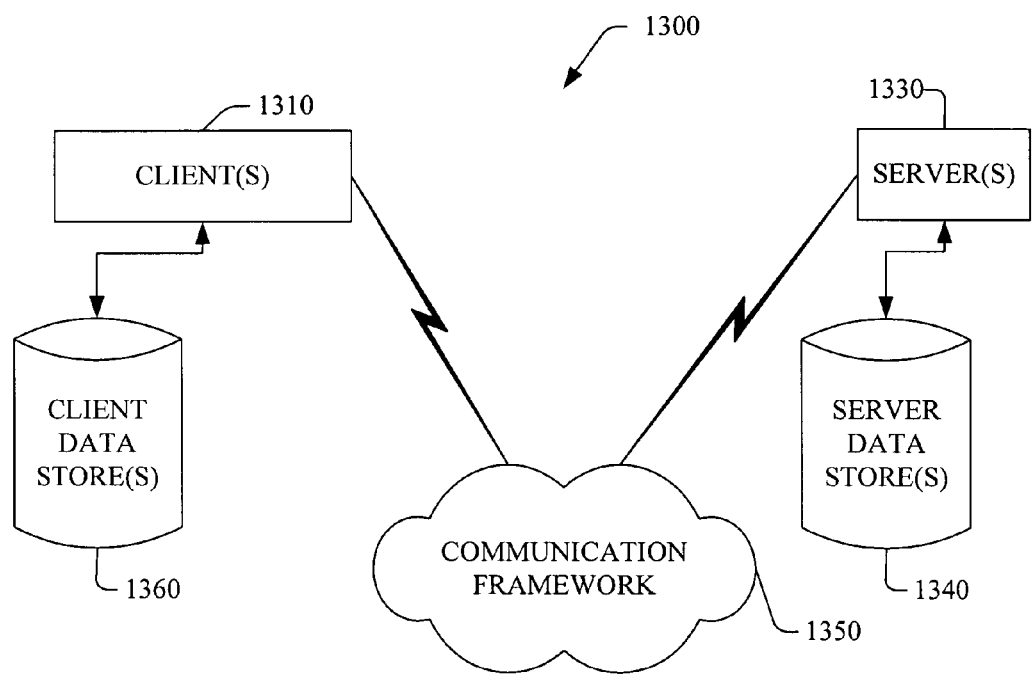
FIG. 13 illustrates an exemplary networking environment.

FIG. 13 is a schematic block diagram of a sample-computing environment 1300 with which the claimed subject matter can interact. The system 1300 includes one or more client(s) 1310. The client(s) 1310 can be hardware and/or software (e.g., threads, processes, computing devices). The system 1300 also includes one or more server(s) 1320. The server(s) 1320 can be hardware and/or software (e.g., threads, processes, computing devices). The servers 1320 can house threads to perform transformations by employing the subject innovation, for example.

One possible communication between a client 1310 and a server 1320 can be in the form of a data packet adapted to be transmitted between two or more computer processes. The system 1300 includes a communication framework 1340 that can be employed to facilitate communications between the client(s) 1310 and the server(s) 1320. The client(s) 1310 are operably connected to one or more client data store(s) 1350 that can be employed to store information local to the client(s) 1310. Similarly, the server(s) 1320 are operably connected to one or more server data store(s) 1330 that can be employed to store information local to the servers 1320.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented set similarity join system, comprising a processor executing the following components:
    a mapping component that maps strings to sets;
    a set similarity join component that provides a similarity join output based, at least in part, upon a set overlap between the sets; and
    the mapping and the join components are invoked by an SSJoin operator, the SSJoin operator based, at least in part, upon R SSJoin$_A^{pred}$ S,
where R and S are relations,
pred is a predicate $\Lambda_i \{Overlap_B(a_r; a_s) \geq e_i\}$,
$e_i$ is an expression involving only constants and columns from either R.A or S.A,
R(A,B) and S(A,B) where A and B are subsets of columns, and,
each distinct value $a_r \in$ R.A defines a group, which is the subset of all tuples in R where R.A $=a_r$.

2. The system of claim 1, the mapping component maps a first string to a first set and a second string to a second set.

3. The system of claim 2, the similarity join component provides a similarity join output based, at least in part, upon a set overlap between the first set and the second set.

4. The system of claim 2, the mapping component maps strings to sets based on q-grams.

5. The system of claim 1, the SSJoin operator returns pairs of distinct values <R.A, S.A > if the overlap of the corresponding groups of R[B] and S[B] values is above a threshold.

6. The system of claim 1, set overlap is determined based, at least in part, upon a function.

7. The system of claim 6, the function is based on at least one of edit similarity, Jaccard similarity, or generalized edit similarity.

8. The system of claim 6, the function is the based on edit distance between a first set $\sigma_1$ and a second set $\rho_2$ based, at least in part upon:

$$ES(\sigma_1, \sigma_2) = 1.0 - \frac{ED(\sigma_1, \sigma_2)}{\max(|\sigma_1|, |\sigma_2|)}$$

where ES denotes edit similarity; and,
    ED denotes edit distance.

9. The system of claim 6, the function is on Jaccard containment, Jaccard containment based, at least in part, upon:

$$JC(s_1, s_2) = \frac{wt(s_1 \cap s_2)}{wt(s_1)}$$

where $s_1$ is a first set,
    $s_2$ is a second set and,
    JC is a Jaccard containment function.

10. The system of claim 6, the function is based on Jaccard resemblance, Jaccard resemblance is based, at least in part, upon:

$$JR(s_1, s_2) = \frac{wt(s_1 \cap s_2)}{wt(s_1 \cup s_2)}$$

where $S_1$ is a first set,
    $S_2$ is a second set and,
    JR is a Jaccard resemblance function.

11. The system of claim 6, the function is based on generalized edit similarity, generalized edit similarity is based, at least in part, upon:

$$GES(\sigma_1, \sigma_2) = 1.0 - \left(\frac{tc(\sigma_1, \sigma_2)}{wt(\text{Set}(\sigma_1))}, 1.0\right)$$

where GES is the generalized edit similarity function,
    $\sigma_i$ is a first string,
    $\sigma_2$ is a second string,
    tc is a total cost function, and,
    wt is a weight function.

12. The system of claim 6, the function is based, at least in part, upon co-occurrence.

13. The system of claim 6, the function is based, at least in part, upon soft functional dependencies.

14. The system of claim 1, the set similarity join component employs a prefix-filter to the sets to determine set overlaps between the sets.

15. The system of claim 1, the similarity join output is based, at least in part, upon a threshold level of similarity.

16. A computer readable storage medium having stored thereon instructions for implementing a set similarity join method, comprising the steps of:
    mapping strings to sets;
    determining set overlap of the sets; and,
    providing a similarity join output based on the set overlap of the sets based on a SSJoin operator, the SSJoin operator based, at least in part, upon R SSJoin$_A^{pred}$ S,
where R and S are relations,
    pred is a predicate $\Lambda_i\{Overlap_B(a_r; a_s) \geq e_i\}$,
    $e_i$ is an expression involving only constants and columns from either R.A or S.A,
    R(A,B) and S(A, B) where A and B are subsets of columns, and, each distinct value $a_r \in R.A$ defines a group, which is the subset of all tuples in R where $R.A=a_r$.

17. The medium of claim 16, set overlap is determined based, at least in part, upon a function.

18. A set similarity join system, comprising a processor executing:
 means for mapping strings to sets; and,
 means for providing a similarity join output based, at least in part, upon a set overlap between the sets; wherein
 the means for mapping and the means for providing similarity join output are invoked by an SSJoin operator, the SSJoin operator based, at least in part, upon $R \, SSJoin_A^{pred} \, S$, where R and S are relations,
 pred is a predicate $\Lambda_i \{Overlap_B(a_r; a_S) \geqq e_i\}$,
 $e_i$ is an expression involving only constants and columns from either R.A or S.A,
 R(A,B) and S(A, B) where A and B are subsets of columns, and,
 each distinct value $a_r \in R.A$ defines a group, which is the subset of all tuples in R where $R.A=a_r$.

19. The system of claim 18, set overlap is determined based, at least in part, upon a function.

\* \* \* \* \*